United States Patent
Regent

(10) Patent No.: US 9,897,226 B2
(45) Date of Patent: Feb. 20, 2018

(54) CONTROL VALVE WITH PRESSURE WAVE ATTENUATOR

(71) Applicant: BorgWarner Inc., Auburn Hills, MI (US)

(72) Inventor: Nicolas Regent, Alzey (DE)

(73) Assignee: BorgWarner Inc., Auburn Hills, MI (US)

( * ) Notice: Subject to any disclaimer, the term of this patent is extended or adjusted under 35 U.S.C. 154(b) by 20 days.

(21) Appl. No.: 15/036,615

(22) PCT Filed: Nov. 19, 2014

(86) PCT No.: PCT/US2014/066319
§ 371 (c)(1),
(2) Date: May 13, 2016

(87) PCT Pub. No.: WO2015/077287
PCT Pub. Date: May 28, 2015

(65) Prior Publication Data
US 2016/0265681 A1    Sep. 15, 2016

(30) Foreign Application Priority Data
Nov. 20, 2013    (DE) .................... 20 2013 010 503 U

(51) Int. Cl.
*F16K 31/12*    (2006.01)
*F02B 37/18*    (2006.01)
(Continued)

(52) U.S. Cl.
CPC ........ *F16K 31/1262* (2013.01); *F02B 37/186* (2013.01); *F15B 15/10* (2013.01); *Y02T 10/144* (2013.01)

(58) Field of Classification Search
USPC ................. 137/488, 489; 251/62, 48, 50
See application file for complete search history.

(56) References Cited

U.S. PATENT DOCUMENTS 2,146,092 A *  2/1939  Raymond .......... G05D 16/0655
                                                       137/510
4,351,285 A     9/1982  Bradshaw
                (Continued)

FOREIGN PATENT DOCUMENTS

JP          62075026 A      4/1987
JP          10143252 A  *   5/1998

OTHER PUBLICATIONS

International Search Report and Written Opinion dated Mar. 13, 2015, in International Application No. PCT/US2014/066319.

*Primary Examiner* — Jessica Cahill
*Assistant Examiner* — Daphne M Barry
(74) *Attorney, Agent, or Firm* — Eric L. Doyle; Stephan A. Pendorf; Patent Central LLC

(57) ABSTRACT

A control valve in which a PWM (pulse width modulated) control pressure signal acts on a membrane to which a control rod is connected tends to wear, and the device to which the control rod is attached likewise tends to wear, due to the transmission of undesired PWM control pressure pulsations. A third chamber is provided in the control valve housing. Control pressure pulsations enter the third chamber via a pressure medium connection. By providing at least one throttle aperture in a partition wall between the third chamber and the membrane acted upon by the pressure medium, it is possible to attenuate the pressure waves, thereby damping the vibration of the control rod, thus avoiding wear.

3 Claims, 1 Drawing Sheet

(51) Int. Cl.
 *F15B 15/10* (2006.01)
 *F16K 31/126* (2006.01)

(56) References Cited

U.S. PATENT DOCUMENTS

| | | |
|---|---|---|
| 4,474,008 A | 10/1984 | Sakurai et al. |
| 5,333,456 A | 8/1994 | Bollinger |
| 2005/0011269 A1 | 1/2005 | Rodenhaeuser et al. |

* cited by examiner

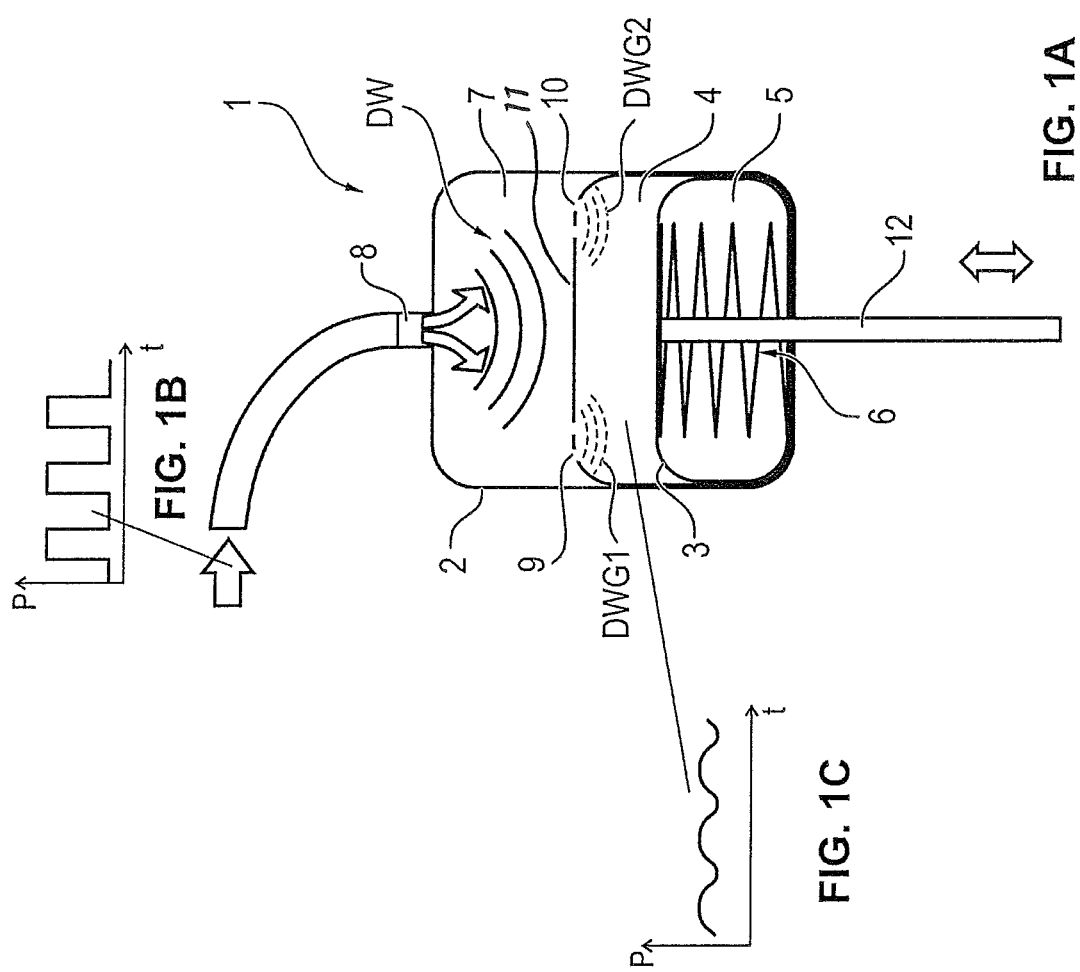

CONTROL VALVE WITH PRESSURE WAVE ATTENUATOR

The invention relates to a control valve, in particular for a control device of an exhaust gas turbocharger according to the preamble of claim 1.

Such a control valve is known from EP 1491754 A1. The control valve is suitable for example for opening and closing a bypass valve of a turbocharger. The control valve according to the prior art this has two chambers, which are separated gas-tightly by a membrane. In this known pneumatic control valve, wear occurs because of undesired vibrations of a control rod connected to the diaphragm due to control pressure pulsations. For regulating the control over-pressure it is known to use valves, which regulate the control pressure employing a so-called PWM signal (pulse width modulation signal). Known, economical valves of this type work with a PWM signal in a frequency range of 20 Hz to 40 Hz. The resulting pulsing pressure in the control valve leads to vibration of the control rod, leading to the above-mentioned wear in a control device, such as a wastegate system, in particular in the region between the spindle and sleeve and the guide piece of such a system.

One solution to the problem of pulsations is the use of an additional separate chamber with a volume of approximately 70 cc before the control valve and a throttling of the pressure port. However, this solution is time-consuming and cumbersome, and moreover it does not produce a satisfactory result, as has been demonstrated in investigations carried out in the process of developing the present invention.

It is therefore an object of the present invention to provide a control valve of the type specified in the preamble of claim 1, which enables an optimized control behavior while avoiding additional components.

This object is achieved by the features of claim 1.

By integrating a third chamber in the housing of the control valve, there is achieved the advantage of a compact, space-saving design, in which additional pressure ports, such as those required in the prior art, can be avoided.

By providing at least one throttle or choke aperture in a partition wall between the third chamber and the adjacent chamber acted upon by the pressure medium, it is possible to attenuate the pressure waves, thereby damping the vibration of the control rod, thus avoiding wear.

Further details, advantages and features of the present invention will become apparent from the following description of an embodiment with reference to the drawing. Therein:

FIG. 1A shows a simplified schematic diagram of the structure of a control capsule according to the invention, FIG. 1B shows a pressure profile of the undamped control pressure introduced into the control valve, and FIG. 1C corresponds to FIG. 1B and illustrates the damped pressure waves.

FIG. 1A is a simplified representation of a control valve 1 according to the invention, comprising a housing 2. In the housing 2, there is a first chamber 4, which is separated from a second chamber 5 via a gas-tight membrane 3. In the second chamber 5, a spring 6 is arranged compression biasing the membrane 3. Furthermore, a control rod 12 is provided which is in force-transmitting connection with the diaphragm 3.

As FIG. 1A further illustrates, in the housing 2, a third chamber 7 is arranged, which is provided with a pressure medium connection 8 for feeding a pressure medium, such as compressed air. The third chamber 7 is used for pressure wave attenuation, wherein the chamber 7 is separated by a partition wall 11 from the first chamber 4.

As illustrated FIG. 1A, in the partition wall 11 there is provided at least one throttle aperture, which in the illustrated particularly preferred embodiment is exemplified by two throttle apertures 9 and 10.

As is shown in FIG. 1A, the fluid chamber 7 is supplied with a pressure medium, for example, at a PWM frequency, which is symbolized in the chamber 7 by the waves DW and of which the pressure profile is shown in FIG. 1B.

After the passage of the pressure wave DW through the chamber 7 and the two throttle apertures 9 and 10 there result damped pressure waves DWG1 and DWG2, whose pressure wave profile is shown in FIG. 1C. From a comparison of FIGS. 1B and 1C one can see the damping effect, which brings about that vibrations of the control rod 12 are at least attenuated, if not even eliminated completely, in order to achieve the above-described more favorable wear characteristic of the control valve 1 of the invention.

In addition to the above written disclosure of the invention, explicit reference is made to the illustrations in FIGS. 1A through 1C to supplement the disclosure.

LIST OF REFERENCE NUMERALS 1 control valve
2 housing
3 membrane
4 first chamber
5 second chamber
6 spring
7 third chamber
8 pressure medium connection
9, 10 throttle or choke aperture
11 partition wall
12 control rod
DW undamped pressure wave
DWG1 and DWG2 damped pressure waves
P pressure
t time

The invention claimed is:

1. A pneumatic control valve (1) having
 a housing (2) which has a pneumatic pressure medium connection (8), and which is divided by means of a gas-tight membrane (3) into
  a first chamber (7, 4), to which a pneumatic control pressure (P) can be introduced via the pneumatic pressure medium connection (8), and
  a second chamber (5), in which a membrane biasing spring (6) and a control rod (12) responsive via the membrane (3) to pneumatic control pressure (P) in the first chamber (4,5) is provided,
 wherein the first chamber is divided by a partition wall (11) into a third chamber (7) into which pneumatic control pressure introduced via the pneumatic pressure medium connection (8) and a first chamber (4) wherein pressure changes are converted into movement of the control rod (12), wherein the partition wall is provided with at least one throttle aperture (9, 10) whereby changes in pressure in the third chamber (7) are communicated to the first chamber, and wherein the at least one throttle aperture is dimensioned such that control pressure pulsations introduced into the third chamber (7) are attenuated in first chamber (4).

2. The control valve according to claim 1, wherein two throttle apertures (9, 10) are arranged in the partition (11).

3. The control valve according to claim 1, wherein a plurality of throttle apertures (9, 10) are arranged in the partition (11).

* * * * *